Oct. 30, 1956 E. J. FREY 2,768,790
MIXING VALVE
Filed May 5, 1953 4 Sheets-Sheet 1

INVENTOR.
Edward J. Frey
BY
His Attorney

INVENTOR.
Edward J. Frey
BY
His Attorney

Oct. 30, 1956     E. J. FREY     2,768,790
MIXING VALVE

Filed May 5, 1953     4 Sheets-Sheet 3

INVENTOR.
Edward J. Frey
BY
R. R. Cauder
His Attorney

Oct. 30, 1956 E. J. FREY 2,768,790
MIXING VALVE
Filed May 5, 1953 4 Sheets-Sheet 4

INVENTOR.
Edward J. Frey
BY
His Attorney

United States Patent Office 2,768,790
Patented Oct. 30, 1956

2,768,790
MIXING VALVE

Edward J. Frey, Dayton, Ohio, assignor to General Motors Corporation, Detroit, Mich., a corporation of Delaware Application May 5, 1953, Serial No. 353,062

3 Claims. (Cl. 236—12)

This invention relates to domestic appliances and more particularly to clothes washing machines.

This application is a continuation-in-part of my copending application S. N. 321,258, filed November 18, 1952, for Domestic Appliance.

An object of this invention is to provide a washing machine with an improved and simplified water supply.

Another object of this invention is to provide a simplified hot and cold water mixing and regulating device for clothes washing machines and the like.

Another object of this invention is to provide a thermostatic mixer capable of supplying a thermostatically controlled mixture of hot and cold fluids, or one of said fluids alone.

Further objects and advantages of the present invention will be apparent from the following description, reference being had to the accompanying drawings wherein a preferred form of the invention is clearly shown.

In the drawings:

Figure 6 is an enlarged view of a portion of Figure 1 but showing the solenoid plunger in closed position.

Figure 7 is a view similar to Figure 6, but showing the plunger in open position.

Figure 8:
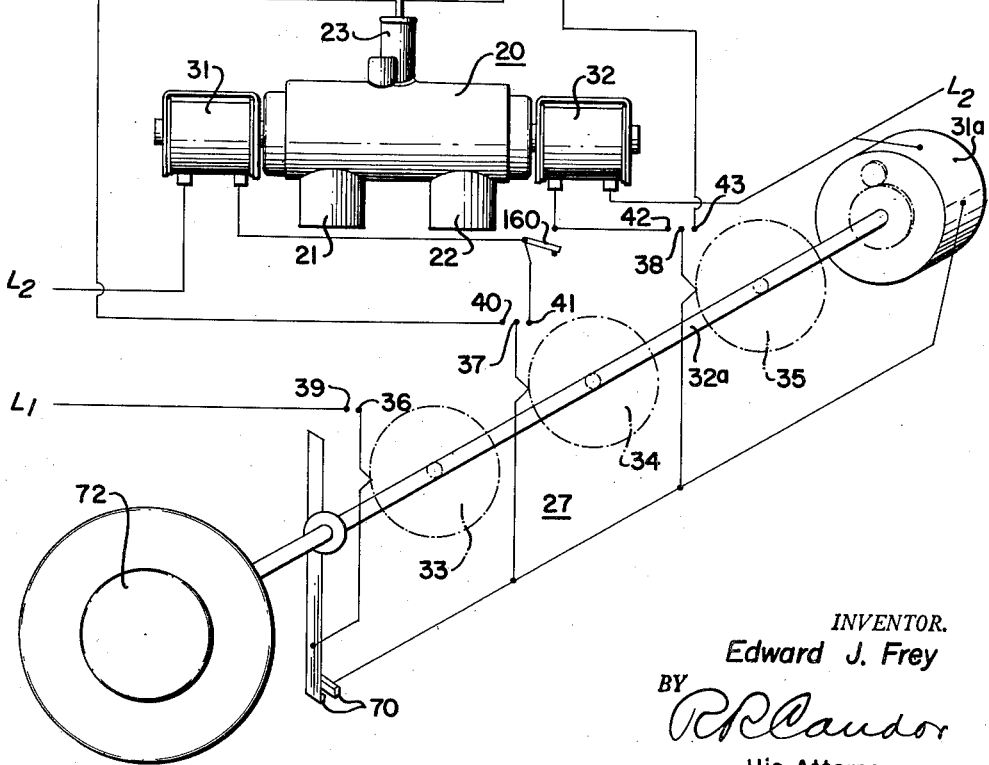
Figure 8 is a diagrammatic representation of the mixer in combination with a timer and a washing machine.

In Figure 8, the mixer 20 is adapted to receive hot water at the hot fluid inlet 21 and cold water at the cold fluid inlet 22 and discharge the fluid received from one or both of the inlets through the fluid outlet 23 and from thence through the pipe 24 into the tub 25 of the washing machine 26. A timer 27 supplies current to the washing machine motor 28, spin agitation solenoid 30, hot water solenoid 31, and cold water solenoid 32. The timer is operated by the timer motor 31a which produces a step-by-step rotation of the shaft 32a to actuate cams 33, 34 and 35 simultaneously or sequentially to close movable contacts 36, 37 and 38 upon stationary contacts 39, 40, 41, 42 and 43. The operation of the structure diagrammatically indicated in Figure 8 may follow the sequence indicated in Figure 9 to produce a complete washing operation which will be more fully hereinafter described.

The washing machine and driving mechanisms may be as indicated in the patents to Kendall Clark, 2,366,236, patented January 2, 1945, and 2,422,395 granted June 17, 1947. The timer may be of the character indicated in the patent to K. O. Sisson, No. 2,520,695, granted August 29, 1950.

Figure 1:
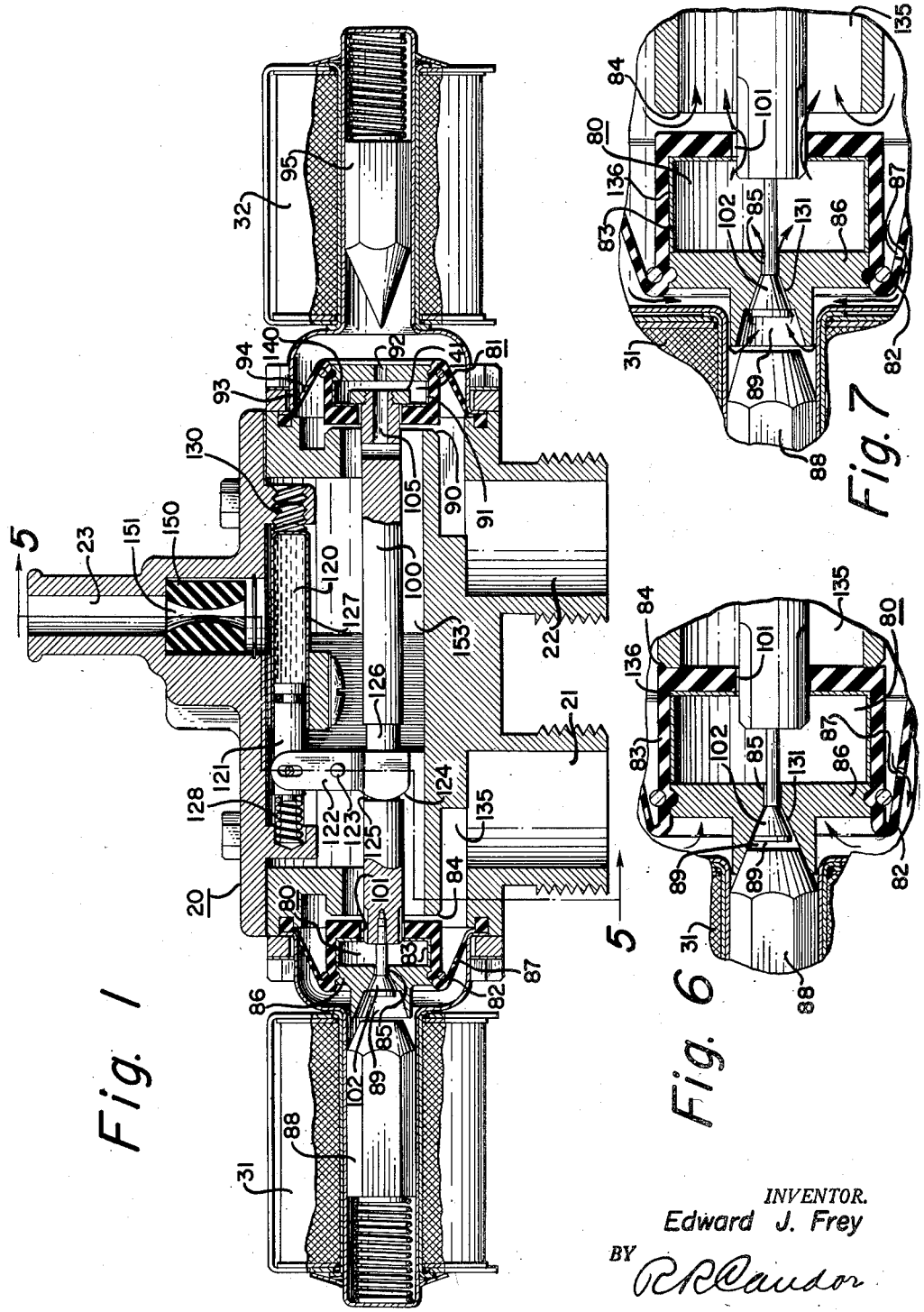
Figure 1 is a cross-section of the mixer.

In Figures 1 to 7 inclusive, and more particularly in Figure 1, the fluid mixer has a hot fluid inlet 21, a cold fluid inlet 22 and a fluid outlet 23. A hot pilot operated diaphragm valve 80 is operated by the solenoid 31 and the cold pilot operated diaphragm valve 81 is operated by the cold solenoid 32.

The valve 80 is connected with the hot fluid inlet 21 and has a diaphragm 82 with a tubular extension 83 governing the hot fluid flow past the valve seat 84. The diaphragm 82 is provided with a pilot opening 85, preferably made in a plate 86 carried by the diaphragm 82. The diaphragm 82 is also provided with a bleeder opening 87 of less capacity than the normal flow through the pilot opening 85. The solenoid 31 is provided with a spring pressed plunger 88 adapted to close the funnel 89 and consequently the bleeder opening 85, as indicated in Figure 6. The valve 80 is adapted to open and close under the action of plunger 88, as indicated in Figures 6 and 7, this action taking place because of the well known pressure differentials created by the operation of the plunger 88.

The cold pilot operated diaphragm valve 81 has a valve seat 90 and a tubular extension 91 governing the flow of cold fluid past the valve seat 90. It also has a pilot opening 92. The valve 81 has a diaphragm 93 provided with a bleeder opening 94, and is adapted to open and close upon the valve seat 90 under the action of the spring pressed solenoid plunger 95 due to the variations in pressure on either side of the diaphragm, as is well known.

A thermostatically operated rod 100 loosely passes through an opening 101 in the extension 83 and has a plug or needle type balancing valve 102 associated with and governing the flow of hot fluid through the pilot opening 85. The rod 100 and its valve 102 variably limit the distance between the extension 83 and the valve seat 84, depending on the axial position of the rod 100. This governs the main flow of hot water past the valve seat 84.

The thermostatically actuated rod 100 may be either fixedly or slidably connected to the tubular extension 91 variably to limit the distance between the valve seat 90 and the extension 91. The rod 100 has a passageway 105 for the flow of fluid from the pilot opening 92 to the outlet 23.

The axial position of the rod 100 governs the relative fluid flow from the inlets 21 and 22 to the outlet 23, as will be hereinafter more fully described. The rod 100 has opening limit stops for the valves 80 and 81, which stops have a fixed length between them. These stops determine the maximum opening limit, at any one time between the hot and cold valves 80 and 81.

The solenoids 31 and 32 may be selectively energized simultaneously to open the valves 80 and 81, or singly to open one of the valves such as the hot valve 80. Under these conditions, either a thermostatically controlled mixture is discharged at the outlet 23, or one fluid, such as hot water only is discharged, depending upon the energization of the solenoids.

Figure 2:
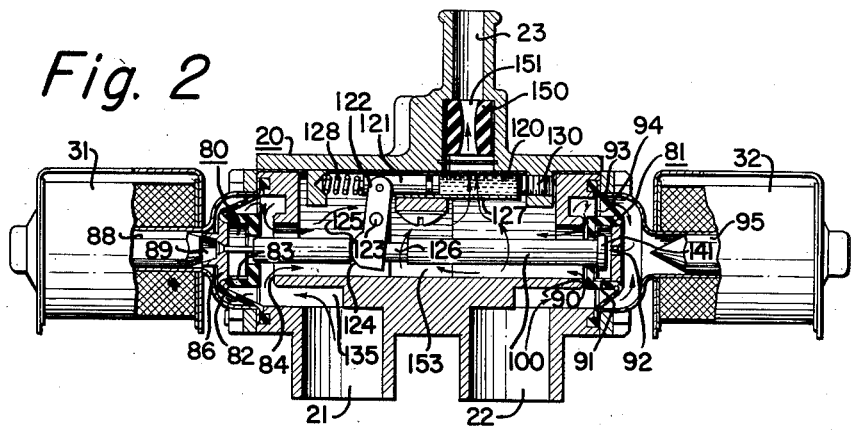
Figure 2 is a view similar to Figure 1 on a reduced scale and showing the mixer operating when the hot water supply is not very hot.
Figure 3:
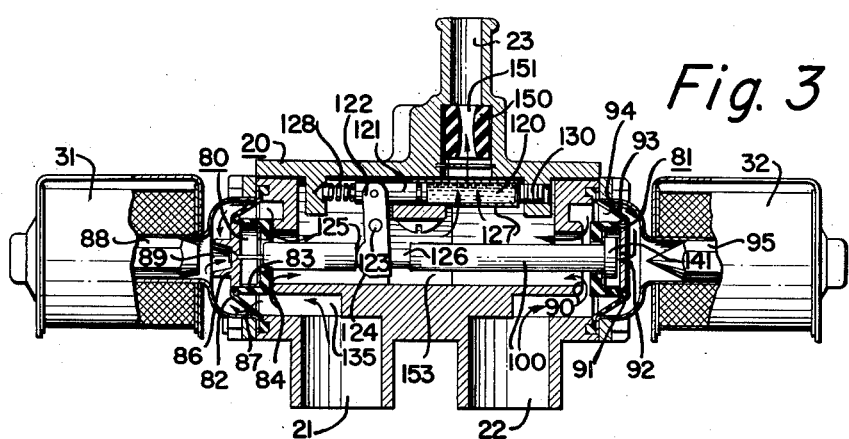
Figure 3 is a view similar to Figure 2 showing the mixer operating when the hot water is very hot.
Figure 4:
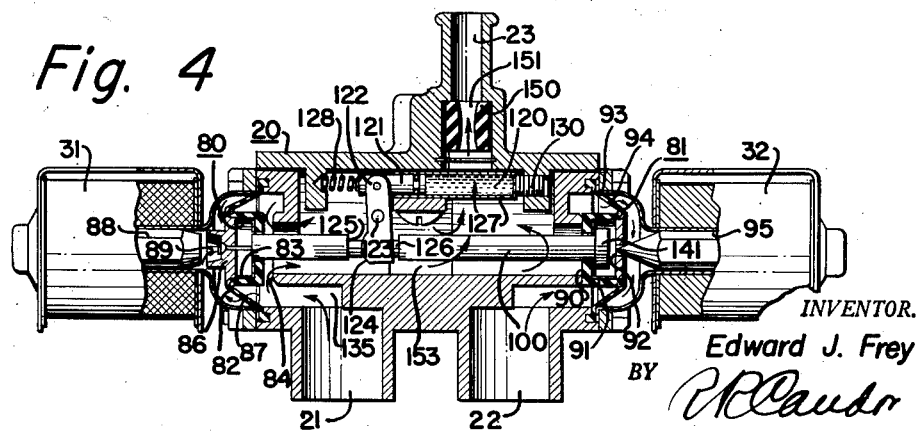
Figure 4 is a view similar to Figure 2 showing the mixer operating to allow hot water only to pass through the mixer.
Figure 5:
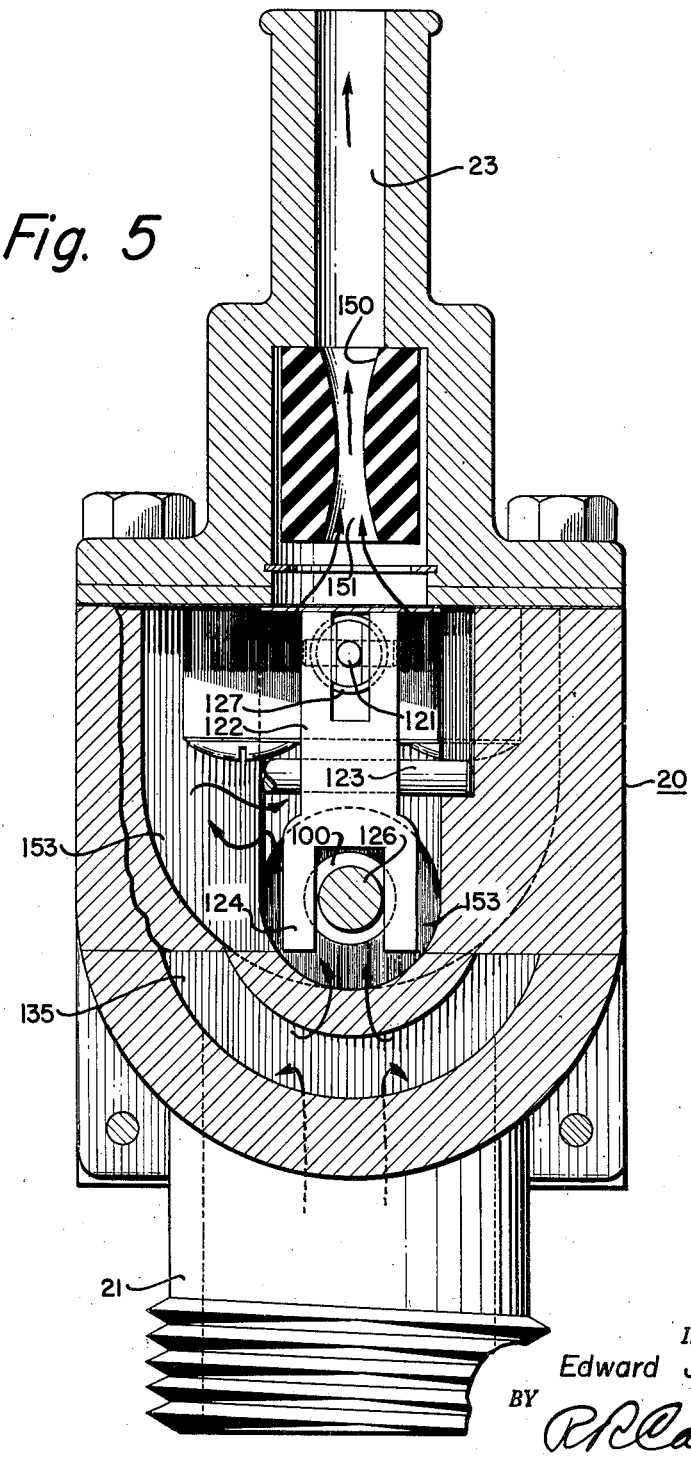
Figure 5 is an enlarged cross-section taken along the line 5—5 of Figure 1.

Notwithstanding the heat applied to it by hot water, the thermostat does not affect the flow of hot water alone, as shown in Figure 4, yet it governs the relative flow of hot and cold water, when both waters are introduced, as shown in Figures 2 and 3.

The rod 100 is thermostatically controlled by the action of the thermostatic substance 120 acting on the plunger 121, which in turn acts upon the lever 122 fulcrumed at 123. The lower end 124 of the lever 122 acts upon the shoulder 125 adjacent the reduced portion 126 of the rod 100. The thermostatic substance 120 is contained within a cylinder 127 in which the plunger 121 telescopes. The plunger 121 is spring pressed by the compression spring 128. The lower end 124 of the lever 122 may move away from the shoulder 125, without necessarily moving the rod 100. However, if there should be a force tending to move the rod 100 towards the right (Figure 1), then the shoulder 125 of rod 100 will follow the position of the lever end 124. The thermostatic setting may be calibrated by turning the cylinder 127 within the threaded connection 130.

The plug or needle type balancing valve 102 is secured to rod 100 and cooperates with pilot opening 85. When both solenoids are energized for mixed flow, as shown in Figures 1, 2 and 3, the hot diaphragm 82, because of pressure drop across its left surface, moves to the left until the pilot opening 85 is obstructed by the needle valve 102. This creates a greater pressure at the left of the diaphragm 82 and, accordingly, the diaphragm then moves to the right until the space around needle valve 102 is sufficient to cause a pressure drop again on the left of the diaphragm. Once more, the diaphragm tends to move to the left to widen the opening at 85 until a substantially balanced pressure condition of the diaphragm is obtained. The diaphragm 82 therefore has a relatively limited opening pull capacity to the left in comparison to the relatively strong opening pull capacity to the right of diaphragm 93 hereafter described.

When both solenoids are energized, both diaphragms 82 and 93 pull on rod 100 away from each other, but diaphragm 93 has the stronger pull and pulls rod shoulder 125 against thermostatic lever end 124. The thermostatically controlled position of end 124 determines the relative open positions of diaphragms 82 and 93 and hence the relative fluid flow past their valve seats.

On the other hand, when only the hot solenoid 31 is energized, there is no pulling action to the left by cold diaphragm 93. Hence, the hot valve may open to the left to its maximum extent, as shown in Figure 4, regardless of the movement of thermostatic end 124 to the right. Hence, the thermostat has no effect on the hot valve 80 under these conditions, notwithstanding that the thermostat is subjected to the relatively high temperature of hot water alone.

The plug 102 is always sufficiently far to the right within the cone 131 so that the solenoid plunger 88 may sit on the cone 89 without touching the plug 102. Under these conditions, whenever the plunger 88 moves to the right, it effectively seals the pilot opening and causes the valve to close as shown in Figure 6. Conversely, when the plunger 88 moves to the left, as shown in Figure 7, then the flow of fluid between the plug 102 and the cone 131 is more than can pass through the bleeder opening 87, and this reduces the pressure on the left-hand side of the diaphragm 82 as compared to the fluid pressure in the annulus 135 to cause the diaphragm 82 to move to the left.

The extension 83 preferably is lined with a metal cup 136. The opening at 101 is sufficiently large to allow free flow of fluid which passes the plug 102.

The extension 91 is lined with a metal cup 140. The right-hand end of rod 100 passes through an opening in the extension 91 and cup 140 and is secured to them by a nut 141 which is welded to cup 140 (or which may be loose within the valve, if preferred) to form one of the opening limit stops previously referred to and to transmit the opposite pulling action between valves 80 and 81, when both solenoids are energized, as indicated in Figures 2 and 3, or to permit valve 80 to open and valve 81 to close, when only solenoid 31 is energized, as indicated in Figure 4.

If desired, a pressure reducer 150, which is adapted to discharge fluid at constant volume, may be placed anywhere on the discharge side of the mixer 20, adapted to deliver a constant volume of fluid, per unit of time, more or less independent of the varying higher pressure in the inlets 21 and 22. The flexing action of the flexible wall of the device 150 varies the size of the opening 151 to provide this constant discharge, as is well known. The device 150 tends to maintain a sufficient fluid pressure within the mixing chamber 153 to insure and permit the pressure actions to actuate the valves 80 and 81.

Figure 9:
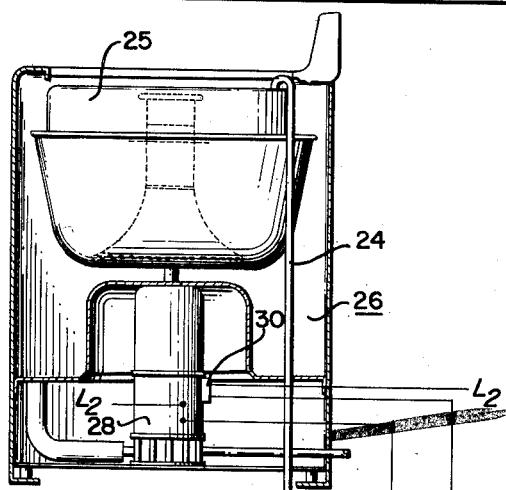
Figure 9 is a chart indicating a sequence of operations for the apparatus shown in Figure 8.

In the operation of the structure shown in Figures 8 and 9, the timer knob 72 is turned to the start position and pushed in. This closes the contacts 41 and 70 and energizes the hot solenoid 31 and timer motor 31a, and introduces hot water to the 4th minute. At this time, the washer motor 28 is energized, without energizing the solenoid 30. This produces an agitation as described in Clark 2,422,395, to the 14th minute, at which time the spin solenoid 30 is energized causing a spinning operation to the 15½ minute. After a half-minute pause, the hot and cold solenoids 31 and 32 are energized to feed mixed hot and cold water to the 20th minute, at which time the washing machine motor is energized to produce agitation of the 21½ minute. Then the spin solenoid 30 is energized to produce a spinning operation to the 23rd minute. After a half-minute pause, both the hot and cold solenoids are energized to feed mixed water to the 27½ minute when the washing machine motor 28 is energized to the 29th minute to produce agitation. At this time, the spin solenoid 30 is energized to produce a spin operation to the 32nd minute.

In the first four minutes of operation only hot water is to be fed into the washing machine unless the tepid selector switch 160 of Figure 8 is moved to its upper position.

If only hot water is to be fed, the hot water can pass through the mixer as shown and heretofore described with respect to Figure 4 without the necessity of providing a separate by-pass and without disturbing or straining the thermostatic action resulting from the heat of the hot water passing the thermostat.

While the form of embodiment of the invention as herein disclosed constitutes a preferred form, it is to be understood that other forms might be adopted as may come within the scope of the claims which follow.

What is claimed is as follows:

1. A mixer having a hot fluid inlet, a cold fluid inlet, a fluid outlet receiving fluid from said inlets; a hot fluid pilot operated diaphragm valve connected with said hot fluid inlet and having a first valve seat, a first tubular extension governing hot fluid flow past said valve seat, and a first pilot opening spaced from said tubular extension; a cold fluid pilot operated diaphragm valve having a second valve seat, a second tubular extension governing the flow of cold fluid past said second valve seat, and a second pilot opening spaced from said second tubular extension; and a thermostatically operated rod loosely passing through an opening in said first extension and having a plug associated with and governing the flow of hot fluid through said first opening and variably limiting the distance between said first extension and said first valve seat, said thermostatically operated rod also being connected to said second tubular extension variably to limit the distance between said second valve seat and said second extension but freely allowing said second extension to close upon said second valve seat, said rod having a passageway for flow of cold fluid from said second pilot opening to said outlet, said rod governing the relative fluid flow from said inlets to said outlet.

2. A mixer having a first fluid inlet, a second fluid inlet, a fluid outlet receiving fluid from said inlets; a first fluid pilot operated diaphragm valve connected with said first fluid inlet and having a first valve seat, a first tubular extension governing first fluid flow past said valve seat, and a first pilot opening spaced from said tubular extension; a second fluid pilot operated diaphragm valve having a second valve seat, a second tubular extension governing the flow of second fluid past said second valve seat, and a second pilot opening spaced from said second tubular extension; and a thermostatically operated rod loosely passing through an opening in said first extension and having a plug associated with and governing the flow of first fluid through said first opening and variably limiting the distance between said first extension and said first valve seat, said thermostatically operated rod also being connected to said second tubular extension variably to limit the distance between said second valve seat and said second extension but freely allowing said second extension to close upon said second valve seat, said rod having a passageway for flow of second fluid from said second pilot opening to said outlet, said rod governing the relative fluid flow from said inlets to said outlet.

3. A mixer having a first fluid inlet, a second fluid inlet, a fluid outlet receiving fluid from said inlets; a first fluid pilot operated diaphragm valve connected with said first fluid inlet and having a first valve seat, a first tubular extension governing first fluid flow past said valve seat, and a first pilot opening spaced from said tubular extension; a second fluid pilot operated diaphragm valve having a second valve seat, a second tubular extension governing the flow of second fluid past said second valve seat, and a second pilot opening spaced from said second tubular extension; a thermostatically operated rod loosely passing through an opening in said first extension and having a plug associated with and governing the flow of first fluid through said first opening and variably limiting the distance between said first extension and said first valve seat, said thermostatically operated rod also being connected to said second tubular extension variably to limit the distance between said second valve seat and said second extension but freely allowing said second extension to close upon said second valve seat, said rod having a passageway for flow of second fluid from said second pilot opening to said outlet, said rod governing the relative fluid flow from said inlets to said outlet; and first and second solenoid selectively operated plungers respectively opening and closing said first and second pilot openings thereby selectively simultaneously to open said valves or singly to open one of said valves.

References Cited in the file of this patent

UNITED STATES PATENTS

| | | |
|---|---|---|
| 1,925,301 | Campbell | Sept. 5, 1933 |
| 2,111,230 | Toussaint | Mar. 18, 1938 |
| 2,424,891 | Kirchoff | July 29, 1947 |
| 2,449,766 | Brown | Sept. 21, 1948 |